Nov. 13, 1962 A. G. NERHEIM 3,063,286
SAMPLE INTRODUCTION SYSTEM FOR GAS CHROMATOGRAPHY APPARATUS
Filed July 14, 1959 2 Sheets-Sheet 1
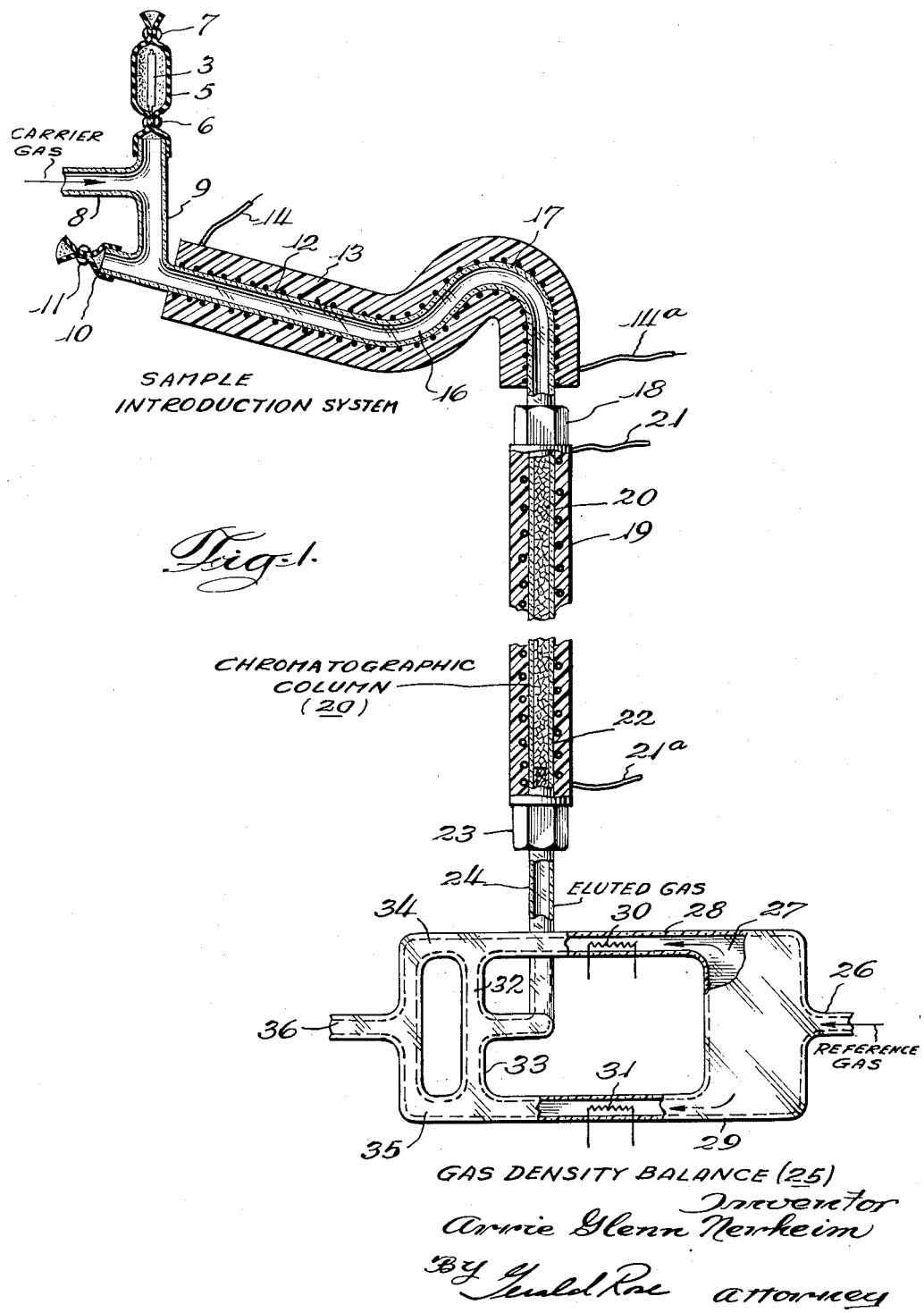

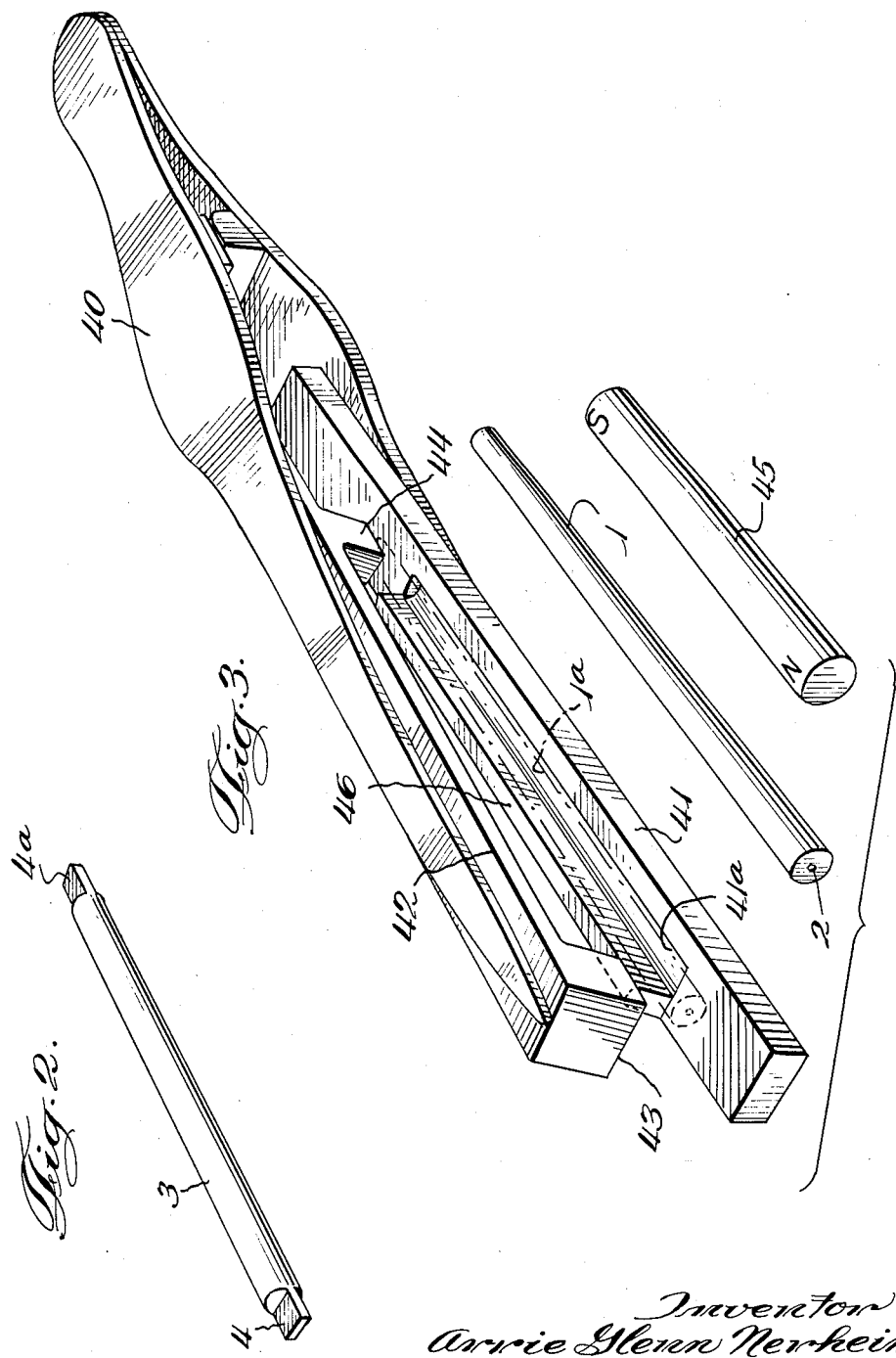

United States Patent Office
3,063,286
Patented Nov. 13, 1962

3,063,286
SAMPLE INTRODUCTION SYSTEM FOR GAS
CHROMATOGRAPHY APPARATUS
Arvie Glenn Nerheim, Crown Point, Ind., assignor to Standard Oil Company, Chicago, Ill., a corporation of Indiana
Filed July 14, 1959, Ser. No. 827,042
8 Claims. (Cl. 73—23)

This invention relates to an improved system for introducing small amounts of fluid samples into a gas chromatography analytical device. More particularly, it provides a system for introducing such samples having accurately determined weights or volumes.

Gas chromatography, a recently developed technique for separation and analysis of complex mixtures of volatile materials, is a system wherein components of such mixtures are separated in simple and inexpensive equipment by selective partition between a stationary liquid phase and a moving gas phase. A few microliters of sample can be analyzed in a relatively short time; the technique is applicable to samples ranging from fixed gases to those that must be distilled at reduced partial pressure.

The operations take place in small columns containing a thin film of the stationary liquid phase, or "substrate." This film is disposed either on the column inner walls or on inert high surface area solids such as crushed firebrick. Components of a gaseous or gasified sample are separated as they are carried through the column by a moving carrier gas phase, called the "eluting gas," and the components are detected in the eluted gas as they exit from the column. Illustrative carrier gases are $H_2$, He, $N_2$, $CO_2$, etc.

Separations are possible in the above described gas chromatography equipment by reason of the properties possessed by different components in the sample of being more or less soluble in the liquid substrate. Accordingly, the least soluble component tends to remain preferably in the gas phase and is swept through the column at a velocity approaching that of the eluting gas. More soluble components, however, will pass through the column at lower rates because the process of dissolving in and expelling from the stationary liquid phase takes additional time. Because of differences in partition, the several components of the original sample emerge from the column in the eluted gas at different times and thus are separated.

Suitable detectors are positioned downstream of the chromatographic column. These are sensitive to the composition of the eluted gas, and generally are adapted to determine the composition and express the result as a chromatogram comprising a series of peaks on a moving strip chart. The location of each peak is a characteristic of that particular component in the test sample, while the integrated peak area is a measure of the absolute amount of that component in the eluted gas.

Both from theoretical and from practical considerations, it is known that the efficiency of separation in a gas chromatographic column improves as the size of the sample is reduced (Keulemans, "Gas Chromatography," page 25, Reinhold, 1957). Accordingly, gas chromatography employs sample sizes on the order of 20 microliters or less, often down to one or two microliters and even as low as 0.02 microliter. Unfortunately, with such minuscule samples, it has hitherto been virtually impossible to accurately determine the amount of sample.

Several methods have heretofore been proposed for obviating the need for determining the amount of sample employed. One involves the use of so-called "internal standards," which are pure compounds that are added in precisely known weights to the sample before analysis, and which record their presence as a distinct peak of measurable area on the chromatographic curve. By knowing the proportion of internal standard to total sample, and by integrating the peak area produced by the standard, it is possible to compute sample weight from a chromatographic curve without actually weighing or measuring the sample. This technique of internal standardization possesses major disabilities; it is only as accurate as the method of measuring the proportion of standard added, and a compound for use as standard must be selected so that its own chromatographic peak is distinct from any peak produced by components of the original sample. The amount of time spent in determining a suitable internal standard for a given sample, and in purifying the standard to eliminate impurities, is entirely out of proportion to the gain in accuracy achieved by its use.

Accordingly, a primary object of the present invention is to provide a technique for gas chromatography which, for the first time, permits the use of reproducible small amounts of sample, even of the order of one or two microliters or less, while at the same time completely eliminates any need for internal standards.

Briefly, and in accordance with the invention, I enclose the sample for analysis in a sealed capsule of known volume or weight which is made from a metal which fuses at a temperature below that at which the sample itself exhibits any substantial decomposition. Such capsules may readily be made by hermetically sealing the sample in an elongated capillary tube made of a low melting point metal. Either the tube volume or the tube weight before and after sealing is determined, and thus the amount of sample can be accurately measured. The sealed capsule is then introduced into the gas chromatographic column via a convenient introduction system which comprises a heated portion of the carrier gas inlet conduit, where the metal melts, and releases and vaporizes the contained sample.

Exceptional precision in preparing small samples of known weights or volumes can be accomplished in accordance with the invention. Consequently, there is no need for internal standards. If the low-melting metal tube has a bore of known internal diameter, and if the tube is crimped at remote locations spaced at a predetermined length, then the sample volume is accurately determinable and is reproducible. By densitometer measurements on large amounts of sample fluid, the sample weight can easily be obtained. A reproducibility of $\pm 0.5\%$ in volume measurements, and $\pm 2\%$ in overall analytical results, is readily attained. Moreover, sample volumes on the order of one microliter and less can be handled conveniently with this same accuracy. The use of encapsulated samples is described in application S.N. 826,757, filed July 13, 1959, by C. E. Ehrhardt, W. H. Moeller, and H. M. Grubb.

Although the instant invention may be employed in conjunction with a wide variety of gas chromatographic systems, it is of special applicability where chromatographic detectors are used which are sensitive to the density of the eluted gas. With these detectors, the absolute weight of any eluted component of the sample is directly proportional to the integrated peak area produced by that component on the chromatogram; the sum of all peak areas is proportional to the total sample weight. Thus, the translation of peak areas into weight concentrations requires either that a complete chromatogram be run (which is impossible with wide boiling range samples such as crude oils), or, more conveniently, that the proportionality constant be determined from a previous run with a pure component and the total sample weight be accurately measured. The latter method permits a selected portion of the complete sample to be chromatographed, if so desired. Since the inventive system provides exceptionally accurate sample weights, this latter, more convenient, method of obtaining weight percent concentrations is made available.

The present encapsulation technique affords numerous additional advantages over heretofore available sample introduction systems. Primarily, systematic errors of weight or volume measurement which affect both precision and accuracy are eliminated entirely. Also, even the most volatile samples can be stored for long periods of time, and can readily be shipped over considerable distances for analysis when necessary for such purposes as in-plant sampling, referee samples, or for cooperative research programs. In addition, the rapid release of sample caused by melting the metal capsule introduces the sample into the carrier gas stream as a contiguous and compact "plug," which is of considerable advantage in securing symmetrical chromatographic peaks and cleaner separations. Furthermore, there is no possibility of contaminating the substrate with liquid sample. If desired, the sample can be introduced through an air lock from which air can be displaced by evacuation or by purging with carrier gas, so as to entirely eliminate air or other contaminants. Lastly, the test sample is not exposed to any high temperatures whatsoever before actual melting of the encapsulating tube. Other advantages will become apparent as the description of the invention proceeds in detail hereinafter.

The invention will be more fully understood by reference to the ensuing specification when read in conjunction with the attached drawings wherein:

FIGURE 1 is a schematic representation of a gas chromatographic system employing the inventive sample introduction system and utilizing a gas density balance as a component detector for the eluted gas;

FIGURE 2 is an external view of an encapsulated liquid sample wherein the ends are accurately pinched to length so as to provide a sealed capsule of known capacity;

And FIGURE 3 shows a tweezer-like die for accurately sizing the metal capsule.

Turning first to FIGURE 1, the figure shows schematically a gas chromatographic system utilizing a capsule made of a metal having a low melting point for introduction of a known amount of fluid sample into the carrier gas stream. The vaporized sample and carrier gas are eluted through chromatographic column 20 where the several components of the sample are resolved, and are detected by means of a composition-sensitive detector 25 such as a gas density balance.

The fluid sample is initially confined within capsule 3, made of a low melting point metal such as indium or the like. The length, outer diameter and bore diameter of capsule 3 may be of any desired size sufficient to provide a fluid sample of suitable volume at sufficient accuracy for analysis. Somewhat more convenience is realized with capillary tubes of less than say one-half inch long, although somewhat better precision and accuracy of volume measurement is attained with slightly longer tubes. A suitable tube size may be tubing which has an inside diameter of 0.010″, and an outside diameter of about 0.040″. Since the requirement of constant volume sample imposes a similar requirement of constant internal diameter, it is desirable that this dimension be held at as accurate a tolerance as possible. Accordingly, drawn tubing is to be preferred. The internal diameter may be of any selected dimension, but if the tube is to be filled with the test sample by capillary action, then it is desirable to have the inner diameter of suitable size to fill the tube in a reasonable length of time, e.g. 0.050″ ID or less.

Metals used in making capsule 3 are available in a wide range of formulas and have varied melting points. It is primarily necessary however that the metal should have a melting point below that at which the sample begins to decompose to an extent which interferes with analysis, and this of course depends largely on the nature of the sample. Either pure elements or alloys of various metals may be be employed.

A low-melting metal for use herein should be relatively soft so that it can be sealed by pinching or the like, it should be malleable so that it can be easily drawn into tubing, and preferably it should have a low vapor pressure when molten. Also, it should not oxidize too readily in air at room temperature so that it can form a metal-to-metal bond by the process of "cold welding" when pressure is applied to adjoining surfaces. Cold welding is a common property of all metals, provided that there be no extensive surface contamination and that the applied pressure be sufficiently great to cause metal-to-metal adhesion. Cold welding, also termed self welding or contact welding, is realized easily at temperatures within about 200° C.–250° C. of the metal's melting point.

Another requirement of the metal is that it not be reactive with the sample fluid at its melting temperature. This consideration somewhat limits the range of usable metals with certain samples, e.g. unstable halogenated organic compounds, but numerous metals are available which are sufficiently inert at their melting points.

It has been found that the metal indium possesses outstanding characteristics of softness, ductility, low melting point (155° C.), and resistance to most chemicals. Accordingly, commercially pure indium metal and the indium-containing alloys such as indium-tin eutectic constitute the preferred fusible metals for use in accordance with the present invention. Indium may easily be die formed into long tubes of hundreds of feet in length, if necessary. Indium however reacts with certain organic compounds, specifically those which release halogens at temperatures above about 150° C., and accordingly more chemically resistant materials such as tin (M.P. 232° C.) may be preferred in this service.

An extensive listing of the chemical and physical properties of individual elemental metals and their various alloys with each other is compiled in the book "Liquid Metals Handbook," by Richard N. Lyon, published jointly by the Atomic Energy Commission and the Department of the Navy, Second Edition (revised), January 1954, especially chapters 2 and 3. Among the elemental metals listed which have melting points below an arbitrarily selected 250° C., there may be mentioned: the alkali metals, especially lithium (M.P. 179° C.); indium; gallium (30° C.); mercury (−39° C.); tin (232° C.); etc. The book lists the composition and melting points of numerous low melting alloys, primarily made up of a major amount of various proportions of bismuth, lead, tin, cadmium, mercury, and antimony, with more or less minor amounts of such metals as thallium, copper, zinc, etc. Illustrative alloys include one of 16 weight percent tin, 21.5% indium, and 62.5% gallium, which melts at 10.7° C., ranging through Woods metal (M.P. 65.5° C.), Lipowitz' alloy (M.P. 70° C.), Rose's metal (M.P. 100° C.).

As mentioned previously, indium tubing is ideal for the present process. Not only does it have the requisite chemical and physical properties for most analytical work, but its vapor pressure at elevated temperatures is exceedingly low, which is of importance when conducting analyses at temperatures above about 200° C.

Turning momentarily to FIGURE 3, elongated tube 1 may have its capillary bore 2 filled with liquid sample by any suitable procedure. It is preferred to employ an open-ended tube of known internal diameter and/or weight and fill the same by capillary action, and thereafter pinch remote portions, preferably the ends, together by means of a pair of dies or jaws which are spaced at a known distance apart.

FIGURE 3 also shows a tweezer-like die for effecting the sealing of tube 1 to contain a known amount of sample. This device essentially comprises a flexible yoke formed by arms 40 and 41, which are movable toward each other by applying pressure to both arms. Two pair of jaws, herein comprising projections 43 and 44 together with arm 41 are spaced at known distances apart. Thus, when arms 40 and 41 are compressed together the jaws defined by projection 43 and arm 41 and by projection 44 and arm 41 simultaneously seal off an accurately reproducible and determinable amount of sample. If desired, the device may contain a bracket 46 as a means for positioning tube 1 (shown dotted as tube 1a) between the respective jaws of the sealing die, and may employ a small magnet 45 to lock the tube 1 in place during sealing. Also, arm 41 may be provided with a recess 41a for the purpose of obtaining a symmetrical shape at ends 4 and 4a (FIGURE 2) of capsule 3.

Amount of sample contained within sample 3 may be computed from the known bore diameter and the length between ends 4 and 4a of capsule 3, or tube 1 may be weighed before and after the filling and sealing operations, etc. Other methods for the determination of sample amount may also be employed in particular circumstances, and mention may be made of such systems as obtaining the ratio of sample weight to peak area by integration of the chromatographic peak obtained from a known amount of a single pure sample, and the like.

If desired, a relatively long tube may be filled by capillarity of other means and the ends therof then sealed. Then individual short portions of the sealed tube may be re-cut using the apparatus shown in FIGURE 3 to provide a plurality of either separated or connected capsules, each having a sample of constant volume and composition.

Gas samples may be obtained and encapsuled by sealing a hollow elongated tube 1 in an atmosphere of the test gas. If the gas is refrigerated and liquefied, it may be convenient to employ gallium (M.P. 30° C.) or indium-tin eutectic as the encapsulating metal.

In obtaining liquid-filled capsules, tube 1 may be sealed either under the surface liquid or, especially if tube 1 has a sufficiently small bore, away from the bulk of the liquid sample.

Turning once again to FIGURE 1, capsule 3 containing a known amount of fluid (gas or liquid) sample for analysis is introduced into the carrier gas conduit (8, 9, 12, 17) via air lock 5. In the embodiment shown in the drawing, air lock 5 simply comprises a length of flexible inert tubing, e.g. polyethylene or silicone rubber, being provided with pinch clamps 6 and 7 of standard laboratory type. Thus, between the clamps there is a chamber 5. By closing clamp 6 and opening clamp 7, sample capsule 3 may be inserted into air lock 5, which is then closed to the atmosphere by closing clamp 7. Upon opening clamp 6, sample capsule 3 falls through conduit 9 to conduit 12.

As in conventional gas chromatography equipment, a stream of carrier gas flows through conduits 8, 9, 12 and 17 of glass or metal into gas chromatographic column 20. Gas chromatographic column 20 contains a thin film of a selectively absorbing liquid either on the walls thereof or forming a coating on inert packing material such as crushed firebrick. Column 20 may be heated by means of heating jacket 19 which is supplied with variable heating current via lead wires 21 and 21a.

The eluted gas leaves chromatographic column 20 via union 23 and passes through conduit 24 to a gas density balance or similar component sensitive detector 25 by means of which the eluted gas is determined. Detector 25 may be of any suitable type, for example those outlined by Keulemans, loc. cit., at page 69, but is preferably of the gas density balance type wherein the detector measures the change in density of the eluted gas caused by the presence of components in the sample.

The balance embodied in FIGURE 1 is of the type recently developed by me, and employs twin filament or thermistor detectors 30 and 31 in vertically displaced channels 28 and 29, through which a stream of reference gas (which preferably has the same composition as the carrier gas admitted through line 8) passes in parallel flow. The eluted gas stream from line 24 is introduced into the balance downstream of the twin detectors, and when such stream contains a component having a density greater than that of the reference gas, the sample stream flows downward through conduit 33 rather than equally through conduits 32 and 33. As a result, the original equal flow of reference gas through conduits 28 and 29 is diverted, and the flow over filament detector 31 is decreased while the flow over detector 30 is increased. This cools the latter filament at a greater rate and permits filament detector 31 to increase in temperature (because of low dissipation of heat therefrom) causing an imbalance in the electrical bridge circuit including the filament detectors 30 and 31. The resulting net change in the electrical resistances of the filaments is then measured as a function of the density of the gas sample.

The balance is also provided with a pressure equalizing chamber 27 into which the reference gas is admitted via line 26, and with flow restrictive outlet channels 34 and 35 terminating in capillary vent 36, from which the reference gas and eluted gas are exhausted to the atmosphere.

When clamp 6 is opened and sample capsule 3 released into detector 9, the capsule descends along inclined conduit 12. Conduit 12 comprises a heated zone which is heated by means of electrical heating jacket 13, which is supplied via current lead wires 14 and 14a, to a temperature sufficient to melt the metal employed for encapsulating the sample. As the metal melts, the sample is simultaneously and rapidly released into the carrier gas stream which flows continuously through the conduit, and hence the vaporized sample is picked up and carried along by the carrier gas.

After melting, the metal remains in a pool at the lowest portion 16 of conduit 12, while the vaporized sample and carrier gas pass up over ascending portion 17 and thence via union 18 to chromatographic column 20. Molten metal collecting in portion 16 can be removed by pouring out via lock 10 or by means of a hypodermic syringe inserted via flexible tubing lock 10 and clamp 11, either after each run or after the introduction of several capsules.

To illustrate the ability of encapsulation to preserve volatile samples for long periods, and without special handling, samples were taken of a mixture of light hydrocarbons. One capsule was analyzed immediately, while the second was retained in the capsule at room temperature for 24 hours and then analyzed. The following results clearly demonstrate the efficiency of the present system:

| Component | Immediate Analysis, weight percent | Day-later Analysis, weight percent |
|---|---|---|
| Isobutane | 0.12 | 0.12 |
| n-Butane | 0.23 | 0.24 |
| Isopentane | 16.82 | 17.37 |
| n-Pentane | 9.70 | 9.58 |
| 2,2-Dimethylbutane | 11.66 | 11.45 |
| 2,3-Dimethylbutane | 7.68 | 7.80 |
| 2-Methylpentane | 21.40 | 21.46 |
| 3-Methylpentane | 12.84 | 12.62 |
| n-Hexane | 14.35 | 14.16 |
| Methyl cyclopentane | 1.26 | 1.28 |
| Cyclohexane | 3.90 | 3.94 |

From the foregoing presentation, it is evident that there has been provided an especially valuable technique for use in modern gas chromatographic analysis procedures. By encapsulating a liquid or gaseous sample in a low-melting metal tube, a small size sample may be introduced into a chromatographic device via an air lock chamber without encountering any contamination. Moreover, the sample is of constant and reproducible known amount, and errors arising from sporadic sample weight or volume determinations may be eliminated entirely.

Numerous modifications of the embodiment shown above will be apparent in light of the principles described. For example, the heated zone where capsule 3 is melted may be made of a block of temperature-conducting metal such as a bronze or a stainless steel, and may be heated by an electrical bayonet heater. A heated metal-draining valve may also be provided.

While the invention in its various aspects has been described with reference to particular embodiments thereof, it is apparent that these are by way of illustration only. Accordingly, it will be understood that modifications and variations thereof will be apparent to those skilled in the art, and it is thus intended to embrace all such modifications and embodiments as fall within the broad scope of the appended claims.

I claim:

1. In a gas chromatography apparatus comprising a chromatographic column, heated conduit means for supplying a carrier gas to said chromatographic column, and a detector positioned downstream of said chromatographic column which is sensitive to the density of the eluted gas, the improvement whereby a small sample of known amount may be introduced into the heated conduit which comprises an elongated tube encapsulating the sample and being made of a metal which is fusible at a temperature below that at which the sample decomposes, and air lock means for transferring said elongated tube to the said heated conduit.

2. Apparatus of claim 1 wherein said elongated tube is a capillary tube having an internal bore of less than about 0.050 inch diameter.

3. Apparatus of claim 1 wherein said metal has a melting point below about 250° C.

4. Apparatus of claim 3 wherein said metal is indium.

5. A system for introducing a fluid sample of known volume into a gas chromatography apparatus which comprises, in combination, an elongated tube containing the sample and enclosed at both ends thereof, said elongated tube being made of a metal which is fusible at a temperature below that at which the sample decomposes; conduit means for flowing a carrier gas into the gas chromatography apparatus; means for introducing the sample-containing elongated tube into said conduit means; and heating means adapted to melt said elongated tube whereby to release the fluid sample in said conduit means.

6. The system of claim 5 wherein said heating means includes an electrical resistance heating element.

7. A gas chromatography apparatus comprising a chromatographic column, conduit means for supplying a carrier gas to said chromatographic column, detector means for determining the composition of eluted gas leaving said chromatographic column, and means for introducing a sample into the conduit for passing carrier gas to said chromatographic column, said means for introducing the sample comprising an elongated tube containing the sample, said elongated tube being made of a metal which is fusible at a temperature below that at which the sample decomposes, air lock means for introducing said elongated tube into the conduit for passing carrier gas to the chromatographic column, and heating means for melting said elongated tube whereby to release said fluid sample in the said conduit.

8. Apparatus of claim 7 wherein said detector means is sensitive to the density of the eluted gas.

References Cited in the file of this patent

UNITED STATES PATENTS

| 2,088,635 | Bruun | Aug. 3, 1937 |
| 2,010,318 | Painter | Aug. 6, 1955 |
| 2,841,005 | Coggeshall | July 1, 1958 |

OTHER REFERENCES

Article: by Dimbat et al. in Analytical Chemistry, vol. 28, No. 3, March 1956, pages 290–297. (Copy in 73–23C.)